(12) United States Patent
Habibullah et al.

(10) Patent No.: US 11,122,637 B1
(45) Date of Patent: Sep. 14, 2021

(54) OUT-OF-BAND TRANSPORT ASSISTED FAST WIRELESS CONNECTION

(71) Applicant: Amazon Technologies, Inc., Seattle, WA (US)

(72) Inventors: Muhaiyadeen Ansarullah Habibullah, Santa Clara, CA (US); Sai Prashanth Chinnapalli, Dublin, CA (US); Milos Jorgovanovic, Mountain View, CA (US); Ganesha Batta, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 2 days.

(21) Appl. No.: 16/657,808

(22) Filed: Oct. 18, 2019

(51) Int. Cl.
  *H04W 8/00* (2009.01)
  *H04W 4/00* (2018.01)
  *H04W 76/14* (2018.01)
  *H04W 68/00* (2009.01)
  *H04W 4/80* (2018.01)
  *H04B 1/713* (2011.01)
  *H04W 72/04* (2009.01)
  *H04W 84/20* (2009.01)

(52) U.S. Cl.
  CPC ............ *H04W 76/14* (2018.02); *H04B 1/713* (2013.01); *H04W 4/80* (2018.02); *H04W 68/005* (2013.01); *H04W 72/0453* (2013.01); *H04W 84/20* (2013.01)

(58) Field of Classification Search
  CPC ...... H04W 4/80; H04W 76/14; H04W 12/003; H04W 28/18; H04W 48/16; H04W 76/11; H04W 76/20; H04W 8/005
  See application file for complete search history.

(56) References Cited

U.S. PATENT DOCUMENTS

2016/0157078 A1\* 6/2016 Palin ..................... H04W 4/80
                                                          455/41.2

\* cited by examiner

*Primary Examiner* — Gary Lafontant
(74) *Attorney, Agent, or Firm* — Lowenstein Sandler LLP

(57) ABSTRACT

Technologies directed to a process of establishing a wireless connection between two devices with out-of-band transport assistance are described herein. In one method, a first device scans for a first message via a first radio. The first message includes information that a second device is using either a first or a second set of frequencies of a page hopping sequence. The first device repeatedly sends, via a second radio, a second message according to only the first or second set specified in the first message. The first device receives, via the second radio at a first frequency of the first or second set, a third message from the second device, via the second radio at the first frequency, a third message comprising additional information that establishes the wireless connection between the first device and the second device via the second radio.

20 Claims, 8 Drawing Sheets

OUT-OF-BAND TRANSPORT ASSISTED FAST WIRELESS CONNECTION

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
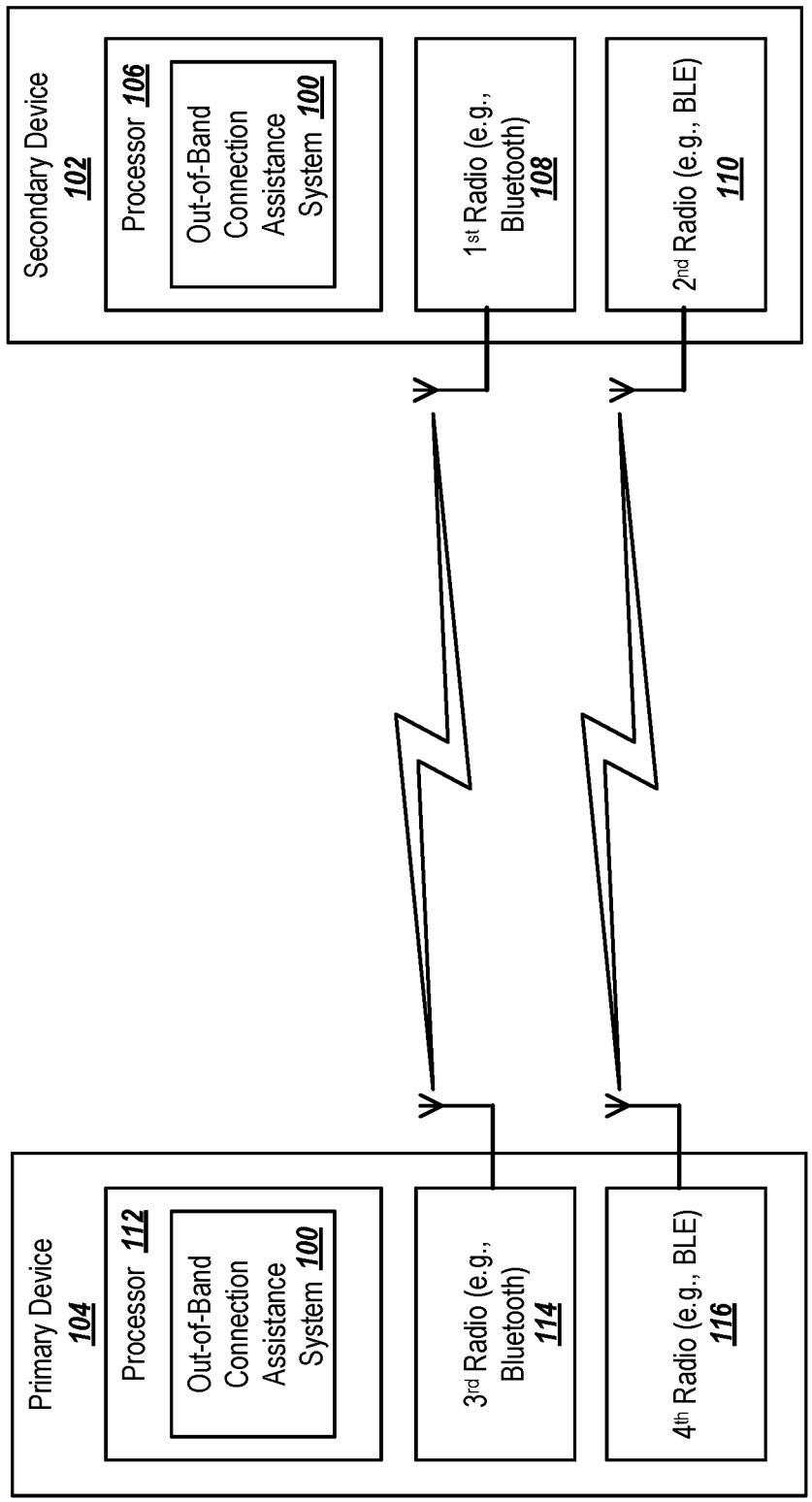
FIG. 1 is a block diagram of an out-of-band connection assistance system for faster wireless connection establishment between a primary device and a secondary device according to one embodiment.

Technologies directed to a process of establishing a wireless connection between two devices with out-of-band transport assistance are described herein. For example, Bluetooth® paging is a process of forming a connection between two Bluetooth® compatible devices. Before this connection can be initiated, each device needs to know the address of the other device. The procedures for establishing connections is asymmetrical and requires that one device carriers out a page process (also referred to as page connection procedures) while the other device is connectable in a page scan process (also referred to as page scanning procedure). The paging process is targeted so that the page process is only responded to by one specified device. The connectable device uses a special physical channel to listen for connection request packets from the paging (connecting) device. The physical channel has attributes that are specific to the connectable device, hence only a paging device with knowledge of the connectable device is able to communicate on this physical channel. As described herein, the device that initiated paging is called a primary device and the device that listens to paging (in a page scan process) is called a secondary device.

During a paging process, the primary device sends an identification (ID) packet with a certain device access code (DAC) repeatedly until a response is received. The primary device does not know exactly when the secondary device wakes up and on which hop frequency. Thus, the primary device transmits a train of identical DACs at different hop frequencies and listens in between transmissions for responses. The primary device uses the secondary device's address (e.g., Bluetooth Device Address (BD_ADDR)) and an estimate of the secondary device's clock to determine the page hopping sequence. To compensate for the uncertainty in knowing the secondary device's clock, the primary device sends it page message during a short time interval on a number of wake-up frequencies. During each transmission slot, the primary device sequentially transmits on two different hopping frequencies. The page hopping sequence of 32 frequencies is divided into two trains, called train A and train B, of 16 frequencies each and each train is repeated for N times or until a response is received, where N is a positive integer specified in the primary device. The paging process ends when a response is received or a timeout value for the paging process is exceeded.

During a page scan process, the secondary device continuously listens for page messages at different hop frequencies derived out of its own address (e.g., BD_ADDR) and clock (CLK). There are 32 paging frequencies in a page hopping sequence that are determined by the secondary device's address. Every 1.28 seconds, for example, a different listening frequency is selected by the secondary device. The listening frequency may belong to either train A or train B based on the hopping sequence selected by the secondary device. A time duration of listening on a hopping frequency is called a scan window. The scan window can vary based on device settings.

Due to the nature of paging and page scan processes, the actual connection establishment between the primary device and the secondary device may take serval seconds. This can be caused by the secondary device staying on one hopping frequency belonging to either train A or train B for the duration of a page scan interval and the primary device may be transmitting ID packets on completely different frequency train. This can cause a minimum latency of 2.56 seconds. In addition, since the primary device has to continually hop through 32 frequencies, the primary device consumes significant current resulting in quicker battery drain for battery-powered devices. For example, wireless earbuds that use Bluetooth® classic transport to connect between the devices, the paging scheme in the Bluetooth® specification poses challenges both in terms of power consumptions and connection latency.

Aspects of the present disclosure provide more optimized paging procedures that provides faster connection setup time as well as minimal current consumption. In one method, a first device scans for a first message via a first radio. The first message includes information that a second device is using either a first or a second set of frequencies of a page hopping sequence. The first device repeatedly sends, via a second radio, a second message according to only the first or second set specified in the first message. The first device receives, via the second radio at a first frequency of the first or second set, a third message from the second device, via the second radio at the first frequency, a third message comprising additional information that establishes the wireless connection between the first device and the second device via the second radio. Using the out-of-band connection assistance system described herein, the actual connection establishment between the primary device and the secondary device may be reduced. This can be caused by the secondary device staying on one hopping frequency belonging to either train A or train B for the duration of a page scan interval and the primary device knowing which train the secondary device is staying on. Since the primary and secondary devices will be on the same train, the amount of time to establish the wireless connection can be reduced. This can cause a maximum latency of 2.56 seconds. Also, since the primary device does not have to continually hop through 32 frequencies, the primary device consumes less current, resulting in slower battery drain for battery-powered devices. For example, wireless earbuds that use Bluetooth® classic transport to connect between the devices, the paging scheme can use Bluetooth® Low Energy (BLE) for side-channel assistance to establish a wireless connection, overcoming the challenges described above with respect to power consumption and connection latency. In one embodiment, a paging process is a set of procedures for establishing a physical link, including a paging process (e.g., a page action by the primary device or initiator) and a page scan process (e.g., a page scan action by the secondary device or responding device). After establishing the physical link, other operations can be performed for link establishment, channel establishment, connection establishment, or the like.

FIG. 1 is a block diagram of an out-of-band connection assistance system 100 for faster wireless connection establishment between a secondary device 102 and a primary device 104 according to one embodiment. The secondary device 102 includes a first processor 106, a first radio 108 (e.g., Bluetooth® (BT) radio) that operates according to a first protocol (e.g., BT Classic protocol) and a second radio 110 (e.g., Bluetooth® Low Energy (BLE) radio) that operates according to a second protocol (e.g., BLE protocol). The primary device 104 includes a second processor 112, a third radio 114 that operates according to the first protocol, and a fourth radio 116 that operates according to the second protocol. In some embodiments, the first radio 108 and the third radio 114 are BT classic radios and the second radio 110 and the fourth radio 116 are BLE radios. In other embodiments, the first radio 108 and the third radio 114 are a first type of Wireless Personal Area Network (WPAN) radios and the second radio 110 and the fourth radio 116 are a second type of WPAN radios. In another embodiment, the first radio 108 and the third radio 114 are WPAN radios and the second radio 110 and the fourth radio 116 are Near-Field Communication (NFC) radios. Alternatively, the first radio 108 and the third radio 114 are WPAN radios and the second radio 110 and the fourth radio 116 are Long Range (LoRa) radios. Alternatively, other types of radios and protocols can be used. In some embodiments, the second radio 110 and the fourth radio 116 consume less power than the first radio 108 and the third radio 114, respectively.

The first processor 106 and the second processor 112 can be various type of processing devices, such as one or more Central Processing Units (CPUs), microcontrollers, field programmable gate arrays, or other types of processors or processing devices. The first processor 106 and the second processor 112 can implement the out-of-band connection assistance system 100 using processing logic that comprises hardware (e.g., circuitry, dedicated logic, programmable logic, microcode, etc.), software, firmware, or a combination thereof, for establishing a wireless connection between the primary device 104 and the secondary device 102 faster than without the out-of-band connection assistance system 100. In one embodiment, the out-of-band connection assistance system 100 performs a custom paging process, such as the custom paging process 300 of FIG. 3, the custom paging process 450 of FIG. 4B, or the like. The out-of-band connection assistance system 100 can perform a method for side-channel assistance in establishing a wireless connection between devices, such as the method 500 of FIG. 5, the method 600 of FIG. 6, or the like. Alternatively, the out-of-band connection assistance system 100 can perform other operations as described below with respect to FIGS. 1-7.

In one embodiment, the secondary device 102 and the primary device 104 use the out-of-band connection assistance system 100 as follows: the first processor 106, via the first radio 108, performs a first process (e.g., a page scan (PS) in the Bluetooth® specification) in which the first processor 106 listens for a first message (e.g., a paging message) that is being repeatedly sent by the primary device 104 according to a first set of frequencies (e.g., train A or train B) of a page hopping sequence. The page hopping sequence can include two sets of frequencies, including the first set of frequencies and a second set of frequencies. These sets of frequencies are sometimes referred to as trains, such as train A and train B of the Bluetooth® specification that uses 32 different frequencies, and each train has 16 different frequencies. Each instance of the first message includes an identical device access code (DAC) corresponding to the secondary device 102. The first processor 106, via the second radio 110, also sends a second message (e.g., an advertisement message). The second message can include information that the first processor 106 is performing the first process using the first train of frequencies (e.g., train A instead of train B) via the first radio 108. The second message can be a BLE advertisement packet, a NFC packet, or the like that includes the information that identifies which train of the multiple trains the secondary device 102 is using to scan for the paging signals. The second processor 112, via the fourth radio 116, performs a second process in which the second processor 112 listens for the second message from the first processor 106. The second process can be periodic BLE scans. It should be noted that the second process is separate from the paging process and is the out-of-band communication mechanisms used by the primary device 104 to receive page scan information, clock information, or the like, from the secondary device 102. The out-of-band communication mechanism can be BLE advertisements, NFC tags, or the like. The second processor 112, via the fourth radio 116, receives the second message from the first processor 106 as a result of the second process. The second processor 112 determines from the second message that the secondary device 102 is performing the first process using only the first set of frequencies (instead of both the first set and the second set). The second processor 112, via the third radio 114, performs a third process in which the second processor 112 repeatedly sends the first message with the DAC corresponding to the secondary device 102 according to only the first set of frequencies of the page hopping sequence. The second processor 112, via the third radio 114, receives a response message from the first processor 106 at a frequency of the first set of frequencies. The second processor 112 establishes a wireless connection between the secondary device 102 and the primary device 104 via the first radio 108 and the third radio 114.

Figure 2:
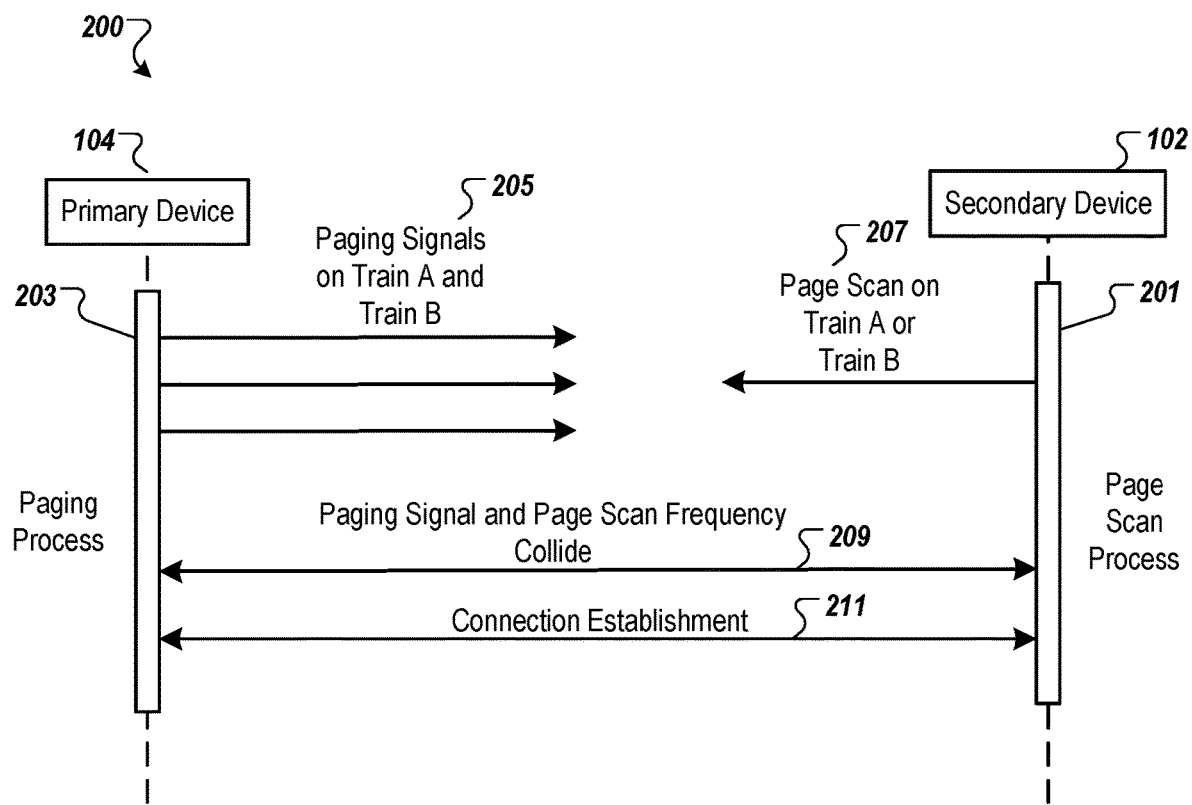
FIG. 2 is a sequence diagram of a standard paging process for paging and connection establishment of a wireless connection without out-of-band assistance according to one implementation.

In one embodiment, the first radio 108 and the third radio 114 are WPAN radios that operate according to the Bluetooth® protocol and the second radio 110 and the fourth radio 116 are WPAN radios that operate according to the BLE protocol. Using the BLE protocol, the second radio 110 and the fourth radio 116 consume less power than the first radio 108 and the third radio 114. The first set of frequencies is a first train (train A) and the second set of frequencies is a second train (train B), each of which identifies a pseudo random set of sixteen different frequencies in the page hopping sequence. The second processor 112 can perform the third process in response to receiving the second message and determining from the second message that the first device is performing the first process using the first train. That is, instead of immediately sending paging signals while in a page mode, the second message can be a trigger to initiate the sending of the paging signals while in the page mode. After the second message (e.g., BLE advertisement) is received that indicates that the secondary device 102 is using a specific train, the primary device 104 can send paging signals using the specific train to establish a wireless connection faster than standard paging processes. Also, by not sending the paging signals until the second message is received can contribute to the primary device 104 consuming less power than when performing a standard paging process, such as illustrated in FIG. 2.

The primary device 104 and the secondary device 102 use the lower power and faster out-of-band connection assistance system 100 (e.g., coordinating sending BLE advertisement or NFC in the paging and page scan processes) on one radio to trigger a paging operating for establishing a wireless connection on another radio, such as to trigger a Bluetooth® classic connection. The out-of-band connection assistance system 100, such as sending BLE advertisements, consumes the lowest amount of power among all BT/BLE operations. Sending information via NFC radio consumes even less power than sending BLE advertisements.

Using BT and BLE as an example of out-of-band transport assisted connection, the following explains one implementation of the out-of-band connection assistance system 100. With the out-of-band connection assistance system 100, the secondary device 102 that would otherwise go into a page scan mode, is now made to go to a page scan mode for the first radio 108, as well as perform BLE advertisement mode for the second radio 110 and sends out page scan specific information, such as page scan train information, clock information, or the like, as part of the advertisement payload. The primary device 104 can start by only perform BLE scans in regular intervals, instead of BT classic paging. Once the primary device 104 receives the advertisement packets from secondary device 102, the primary device 104 initiates a custom paging process based on the page scan information received as part of advertisement payload. The custom paging process involves paging only on a specific page train instead of both on Page train A and Page train B. This can reduce the paging time by 50%. The primary device 104 can also use the clock information that comes as part of an out-of-band communication mechanism (e.g., BLE advertisement payload or NFC tags) to estimate the hopping frequency of secondary device 102 so that it pages on fewer number of frequencies as compared to standard paging process. The custom paging process adds an insignificant additional load of BLE advertisement (e.g., advertising in 3 channels for every 100 milliseconds (ms) or so). However, the custom paging process can reduce the power consumption on paging device which will now only perform BLE scan (going through 3 channels with a fixed interval) instead of BT paging (continuously hopping through 32 channels) until it is certain that secondary device 102 is present for reconnection.

Additional details of the out-of-band connection assistance system 100 are described below with respect to FIGS. 2-4.

FIG. 2 is a sequence diagram of a standard paging process 200 for paging and connection establishment of a wireless connection without out-of-band assistance according to one implementation. Paging, in general, is the process of forming a wireless connection between two devices. Before this wireless connection can be initiated, each device needs to know the address of the other device. The procedures for forming the wireless connection is asymmetrical and requires that one device carries out the page (connection) procedures while the other device is connectable with page scan procedures. The procedures are targeted so that the page procedure is only responded to by one specified device, the secondary device 102. The connectable device, i.e., the secondary device 102, uses a special physical channel to listen for connection request packets from the paging (connecting) device, i.e., the primary device 104. This physical channel has attributes that are specific to the connectable device, hence only a paging device with knowledge of the connectable device is able to communicate on this channel. As noted above, the device that initiates paging process is called a primary device and the device that listens to paging (page scan) is called a secondary device.

Referring to FIG. 2, in the standard paging process 200, the secondary device 102 performs a page scan process 201 and the primary device 104 performs a paging process 203. In the paging process 203, the primary device 104 sends paging signals 205 on two trains, including train A and train B. In the page scan process 201, the secondary devices scans for the paging signals on the two trains, including train A and train B. Scanning for the paging signals is called a page scan 207. Paging means sending an identification (ID) packet with a certain DAC repeatedly until a response is received from the secondary device 102. The primary device 104 does not know exactly when the secondary device 102 wakes up and on which hop frequency the secondary device 102 is performing the page scan, therefore it transmits a train of identical DACs at different hop frequencies and listens in between for responses. The primary device 104 can use the secondary's BD_ADDR and an estimate of the secondary's clock to determine the page hopping sequence. To compensate for the uncertainty in the knowledge of a secondary device's clock, the primary device 104 send its page message during a short time interval on a number of wake-up frequencies. During each transmission slot, the primary device 104 sequentially transmits on two different hopping frequencies. The page hopping sequence of 32 frequencies is divided into two trains (called train A and train B) of 16 frequencies each and each train is repeated for N times or until a response is received. Paging ends when a response is received by the primary device 104 from the secondary device 102 or a paging timeout value to is exceeded. As illustrated in FIG. 2, the paging ends when the paging signal and the page scan frequencies collide at 319. That is, the secondary device 102 receives the paging signal on one of the frequencies of train A. Once the paging signal and the page scan frequencies collide 208, the primary device 104 and secondary device 102 can exchange additional information for connection establishment at 211.

The secondary device 102 in the page scan process 201 can continuously listens for page messages at different hop frequencies derived out of its own address (e.g., BD_ADDR) and clock signal (CLK). There can be 32 paging frequencies in a page hopping sequence and the page hopping sequence can be determined by the secondary device's BD_ADDR. For example, every 1.28 seconds, a different listening frequency is selected by the secondary device 102. The listening frequency may belong to either train A or train B based on the page hopping sequence selected by the secondary device 102. The time duration of listening on a specific frequency is called a scan window. The scan window can vary based on device settings.

Figure 4B:
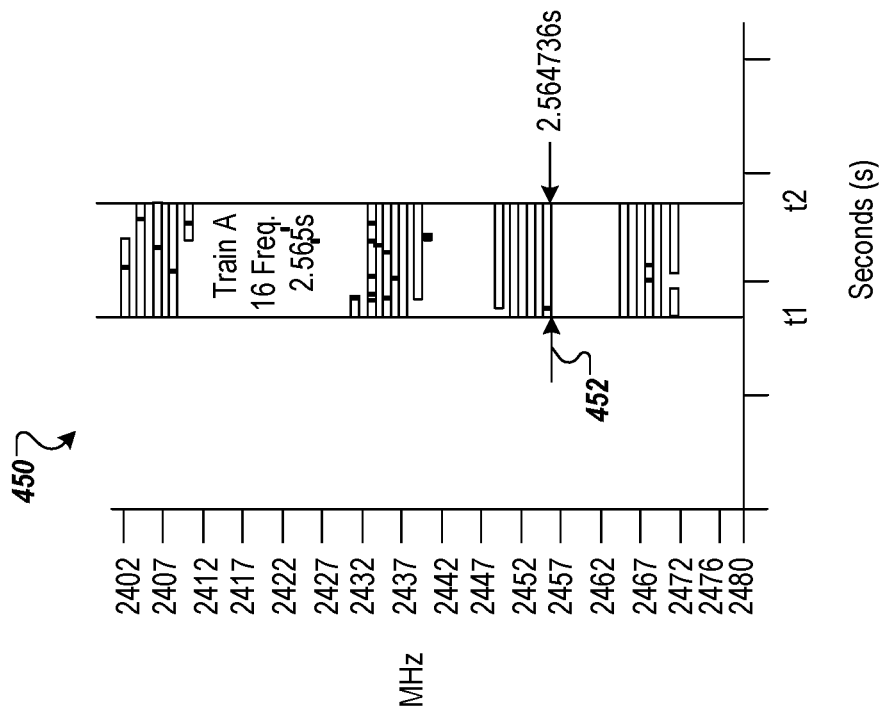
FIG. 4B is graph illustrating a page hopping sequence with a single train in a custom paging process according to one implementation.
Figure 4A:
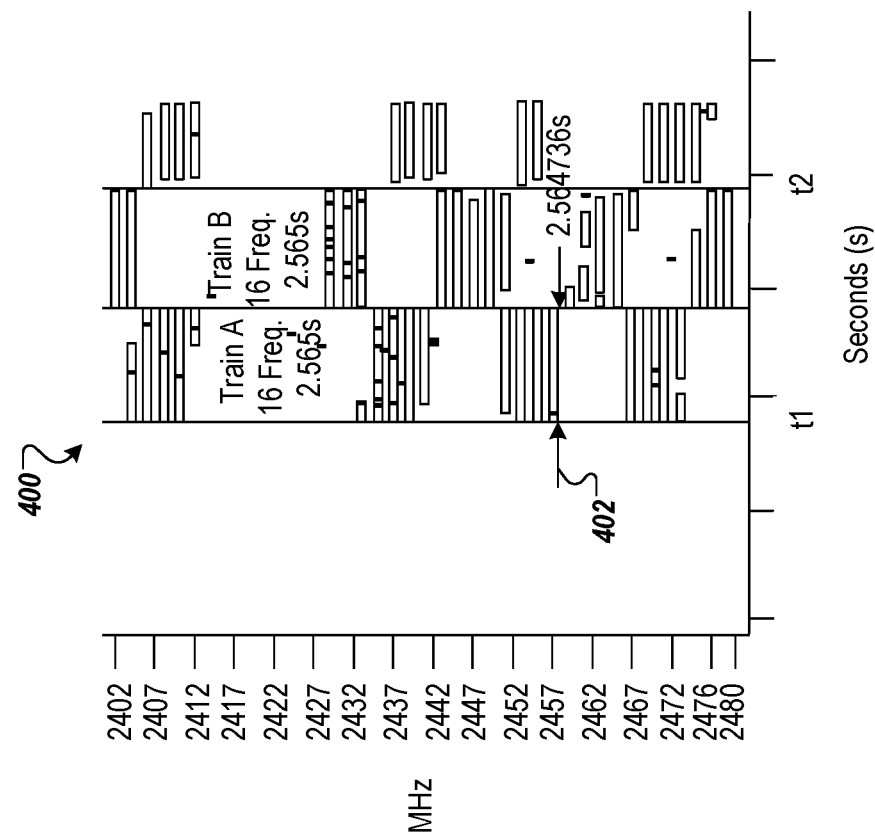
FIG. 4A is graph illustrating a page hopping sequence with a first train and a second train in a standard paging process according to one implementation.

As described above, due to nature of paging process 203 and the page scan process 201, the actual connection establishment between the primary device 104 and secondary device 102 may take several seconds. This is due to the secondary device 102, i.e., the page scanning device, can stay at one hopping frequency belonging to either of train A or train B for the duration of page scan interval and the paging device may be transmitting ID packets on a completely different frequency train. This can cause a minimum latency 402 of 2.56 seconds, as shown in FIG. 4A.

Figure 3:
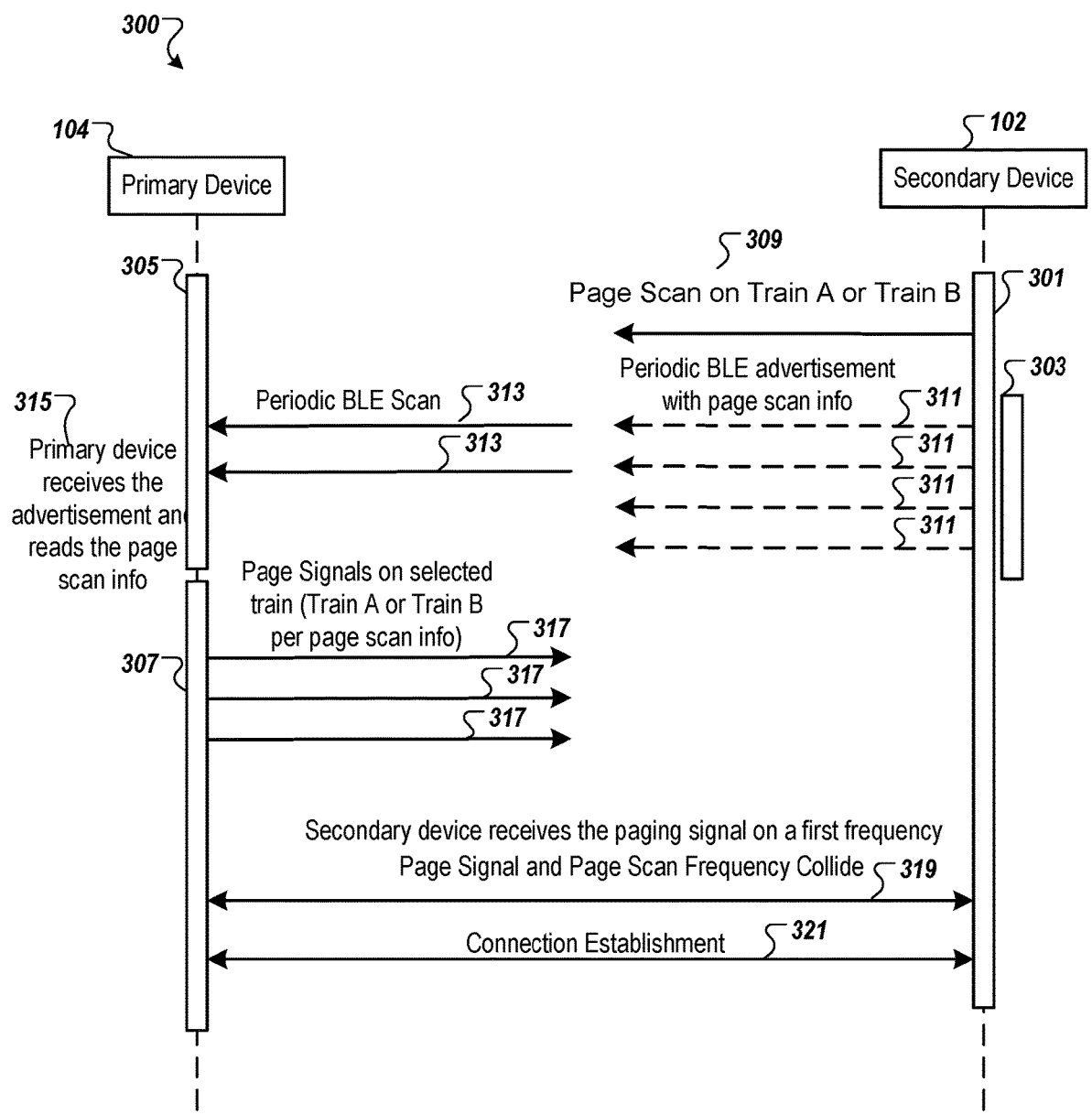
FIG. 3 is a sequence diagram of a custom paging process for paging and connection establishment of a wireless connection with out-of-band assistance that is faster than the process of FIG. 2 according to one embodiment.

FIG. 3 is a sequence diagram of a custom paging process for paging and connection establishment of a wireless connection with out-of-band assistance that is faster than the process of FIG. 2 according to one embodiment. In the custom paging process 300, the secondary device 102 performs a page scan process 301 and an out-of-band connection assistance process 303 and the primary device 104 performs an out-of-band connection assistance process 305 and a limited paging process 307. In the page scan process 301, the secondary device 102 scans for paging signals on only one of the two trains, including train A and train B in a page scan 309. In the out-of-band connection assistance process 303, the secondary device 102 sends periodic messages 311 (e.g., BLE advertisement packets) with the page scan information, including information that the secondary device 102 to which the primary device 104 is to establish a wireless connection is using either a first set of frequencies or a second set of frequencies of a page hopping sequence. For this example, it is assumed that the secondary device 102 is using train A in the page scan 309, so the secondary device 102 sends information to the primary device 104 that the secondary device 102 is using train A in the page scan 309 (also referred to herein as page scan information). The secondary device 102 can also send clock information that can be used by the primary device 104 to derive a hopping frequency of the secondary device 102.

In the out-of-band connection assistance process 305, the primary device 104 performs periodic scans 313 via the fourth radio to listen for the periodic messages 311 (e.g., BLE advertisement packets) with the page scan information sent by the secondary device 102. The primary device 104 receives the message 311 and reads the page scan information to be used for the limited paging process 307. The limited paging process 307 is a limited process in that the paging signals are sent on the frequencies corresponding to the page scan information only. To continue with the example above where the secondary device 102 is using the train A, the page scan information indicates train A is the train to be used by the primary device 104 for the limited paging process 307. In the limited paging process 307, the primary device 104 sends paging signals 317 only on one train, train A in this example. The primary device 104 sends paging signals, including an ID packet with a certain DAC repeatedly until a response is received from the secondary device 102. The primary device 104 does not know exactly when the secondary device 102 wakes up and on which hop frequency the secondary device 102 is performing the page scan, but does know that the secondary device 102 is using train A. Therefore, the primary device 104 transmits a train of identical DACs at different hop frequencies in train A and listens in between for responses. The primary device 104 can use the secondary's BD_ADDR and an estimate of the secondary's clock to determine the page hopping sequence. The page hopping sequence of 32 frequencies is divided into two trains (called train A and train B) of 16 frequencies each and each train is repeated for N times or until a response is received. However, using the page scan information, the primary device 104 can use only the 16 frequencies in the selected train. Paging ends when a response is received by the primary device 104 from the secondary device 102 or a paging timeout value to is exceeded. As illustrated in FIG. 3, the paging ends when the paging signal and the page scan frequencies collide at 319. Once the paging signal and the page scan frequencies collide at 319, the primary device 104 and secondary device 102 can exchange additional information for connection establishment at 321.

Unlike in the standard paging process of FIG in which the page scan process 201 listens to 32 different paging frequencies, the secondary device 102 in the page scan process 301 can continuously listens for page messages at different hop frequencies in one of the trains and the different hop frequencies are derived out of its own address (e.g., BD_ADDR) and clock signal (CLK). As such, there is 16 paging frequencies in a page hopping sequence and the page hopping sequence can be determined by the secondary device's BD_ADDR. For example, every 1.28 seconds, a different listening frequency is selected by the secondary device 102. The listening frequency may belong to either train A or train B based on the page hopping sequence selected by the secondary device 102.

The embodiments described herein can use an advertisement packet for sending page scan information. A payload of the advertisement packet can include information set for the in Table 1.

TABLE 1

| Byte Offset | Value | Description |
| --- | --- | --- |
| 0 | 0x02 | Length of FLAGS field |
| 1 | 0x01 | Indicates FLAGS |
| 2 | 0x1A | Both BR/EDR and LE are supported |
| 3 | 0x1A | Length of "MANUFACTURER_SPECIFIC_DATA" |
| 4 | 0Xff | Indicates "MANUFACTURER_SPECIFIC_DATA" |
| 5-6 | 0x0171 | Vendor Identifier (VID) |
| 7 | 0x01 for Train A/ 0x02 for Train B | Page train info on which secondary device is currently page scanning |
| 8-11 | Clock Info | 4 byte presentation of clock |
| 12-30 | 0x00 | Reserved. Fill Zeros |

Advertisement Type: Undirected, non-connectable
Advertisement Data Type: Manufacturer specific type (0xFF)

As described above, the out-of-band communication mechanism (periodic messages 311) provides more optimized paging procedures that provides faster connection setup time as well as minimal current consumption. Using the out-of-band connection mechanism described herein, the actual connection establishment between the primary device 104 and the secondary device 102 can be reduced. This can be caused by the secondary device 102 staying on one hopping frequency belonging to either train A or train B for the duration of a page scan interval and the primary device 104 knowing which train the secondary device 102 is staying on. Since the primary and secondary devices will be on the same train, the amount of time to establish the wireless connection can be reduced. This can cause a maximum latency 452 of 2.56 seconds, as illustrated in FIG. 4B. Also, since the primary device 104 does not have to continually hop through 32 frequencies, the primary device 104 consumes less current, resulting in slower battery drain for battery-powered devices. For example, wireless earbuds that use Bluetooth® classic transport to connect between the devices, the paging scheme can use Bluetooth® Low Energy (BLE) for the side-channel communication mechanism to establish a wireless connection, overcoming the challenges described above with respect to power consumption and connection latency.

Described above, the secondary device 102 can send periodic BLE advertisements with the page scan information, the clock information, or the like. In other embodiments, the secondary device 102 can send messages using other radio technologies, such as NFC. When using an NFC radio for out-of-band communication assistance, the secondary device 102 can send NFC tags with the page scan information, the clock information, or the like, to the primary device 104. The primary device 104 can receive the NFC tag and send paging signals only on a selected set of frequencies, such as train A (or train B). That is, the primary device 104 can perform the limited paging process 307 with page scan information received by sharing the same information over NFC as the out-of-band technology. In this case, it is assumed that at least one of the devices is performing an NFC active scan to communication the page scan information, the clock information, or the like, before the limited paging process 307. The other device can be in a NFC passive mode or an NFC active mode. The moment the NFC device of the device detects the signal, the NFC devices can exchange the information, such as NFC writes on to the other device with the same information as described above with respect to the BLE advertisement payloads. In some cases, the NFC scans can happen every 10 milliseconds (ms) and this out-of-band communication can reduce reconnection time at least by 70%, for example. In other embodiments, other radio technologies can be used for the out-of-band communication mechanism for the out-of-band connection assistance, such as nanoscale, NFC, Body Area Network (BAN), PAN, and Near-Me Network (NAN) types of radio technologies.

In one method, a first device scans for a first message via a first radio. The first message includes information that a second device is using either a first or a second set of frequencies of a page hopping sequence. The first device repeatedly sends, via a second radio, a second message according to only the first or second set specified in the first message. The first device receives, via the second radio at a first frequency of the first or second set, a third message from the second device, via the second radio at the first frequency, a third message comprising additional information that establishes the wireless connection between the first device and the second device via the second radio.

In another embodiment, a first device scan for a first message, via a first radio using a first set of frequencies of a page hopping sequence, the page hopping sequence comprising the first set of frequencies and a second set of frequencies and the first message comprising an identifier corresponding to the first device. The first device sends, via a second radio, a second message comprising information that the first radio is using only the first set of frequencies to establish a wireless connection with a second device via the first radio. The first device receives, via the first radio at first frequency of the first set of frequencies, the first message with the identifier corresponding to the first device responsive to the second device receiving the second message and repeatedly sending the second message according to only the first set of frequencies of the page hopping sequence. The first device sends, via the first radio at the first frequency, a third message to the second device responsive to the first device receiving the first message at the first frequency, the third message comprising information to establish a wireless connection between the first device and the second device via the first radio.

FIG. 4A is graph illustrating a page hopping sequence 400 with a first train and a second train in a standard paging process according to one implementation. In the standard paging process, the page hopping sequence 400 includes a first train (train A) and a second train (train B), each with 16 different frequencies. As described above, since the primary device 104 does not know which train is being used by the secondary device 102, a minimum latency 402 of 2.56 seconds can occur. FIG. 4B is graph illustrating a page hopping sequence 450 with a single train in a custom paging process according to one implementation. In the custom paging process, the primary device 104 knows from the page scan information that the secondary device 102 is using train A, so the page hopping sequence 450 can include a single train. As described above, since the primary device 104 knows the train being used by the secondary device 102, a maximum latency 452 of 2.56 can be achieved.

Figure 5:
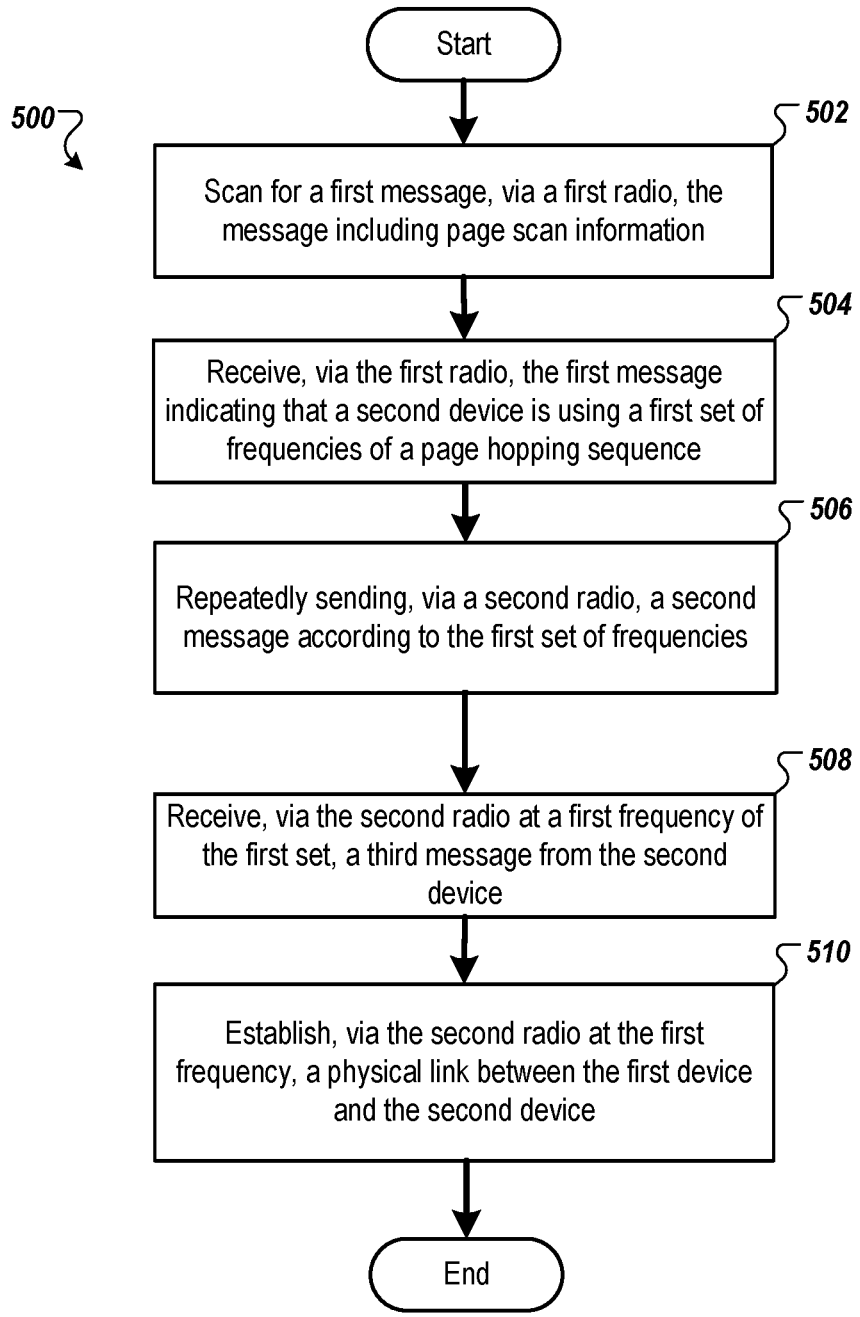
FIG. 5 is a flow diagram of a method for side-channel assistance in establishing a wireless connection between a first device and a second device according to one embodiment.

FIG. 5 is a flow diagram of a method 500 for side-channel assistance in establishing a wireless connection between a first device and a second device according to one embodiment. The method 500 may be performed by processing logic that comprises hardware (e.g., circuitry, dedicated logic, programmable logic, microcode, etc.), software, firmware, or a combination thereof. In one embodiment, the method 500 may be performed by any of the primary devices 104 described herein and illustrated with respect to FIGS. 1-4. The method 500 can be used by the primary device for out-of-band transport assistance to establish a wireless connection between the primary device and a secondary device.

Referring back to FIG. 5, the method 500 begins by the processing logic receiving a first message, via a first radio, the first message comprising information that a second device to which the first device is to establish a wireless connection is using either a first set of frequencies or a second set of frequencies of a frequency hopping sequence (block 502). The processing logic receives, via the first radio, the first message comprising the information that the second device is using the first set of frequencies of the page hopping sequence (block 504). The processing logic sends or repeatedly sends, via a second radio, a second message according to the first set of frequencies of the page hopping sequence (block 506). It should be noted that the processing logic can send the second message according to only the first set of frequencies of the frequency hopping sequence. The second message includes an identifier corresponding to the second device. The first radio can be a type of radio that consumes less power than a second radio of the first device. The processing logic receives, via the second radio at first frequency of the first set of frequencies, a third message from the second device responsive to the second device receiving the second message at the first frequency (block 508). The processing logic establishes, via the second radio at the first frequency, a physical link the first device and the second device via the second radio (block 510), and the method 500 ends. In further embodiments, the processing logic can perform additional operations after establishing the physical link, such as operations for link establishment, channel establishment, connection establishment, authentication, security, or the like.

In one embodiment, the first radio is a first WPAN radio that operates according to a first WPAN protocol and the second radio is a second WPAN radio that operates according to a second WPAN protocol that is different than the first WPAN protocol. The first WPAN radio consumes less power than the second WPAN radio. In another embodiment, the first radio is a NFC radio that operates according to a NFC protocol and the second radio is a WPAN radio that operates according to a WPAN protocol. Alternatively, other radio technologies can be used.

In a further embodiment, the processing logic sends or repeatedly sends the second message in in response to receiving the first message via the first radio and until receiving the third message or until an end of a specified time period. For example, a timeout value for paging is exceeded can represent the end of the specified time period.

In another embodiment, the processing logic sends or repeatedly sends the second message by sending the second message at each frequency of the first set of frequencies (e.g., train A or train B only) during a first time period. In some cases, in response to receiving the third message form the second device, the first device ceases to send the second message during the first time period. If the third message is not received, the first device can continue to send the second message at each frequency of the first set of frequencies during a subsequent time period after the second time period. In response to receiving the third message from the second device, the processing logic ceases to send the second message at each frequency of the first set of frequencies in the sequence during the subsequent time period.

In one embodiment, the first set of frequencies is a first train (train A) and the second set of frequencies is a second train (train B), each of which identifies a pseudo random set of sixteen different frequencies in the frequency hopping sequence. The processing logic sends the second message at each of the sixteen different frequencies in the first train for N times until receiving the third message or until an end of a specified time period, where N is a positive integer. In another embodiment, the processing logic sends the second message at each frequency of the first set (e.g., train A or train B only) at a first time. The processing logic sends the second message at each frequency of the first set at one or more times after the first time until receiving the third message or until an end of a specified time period.

Figure 8:
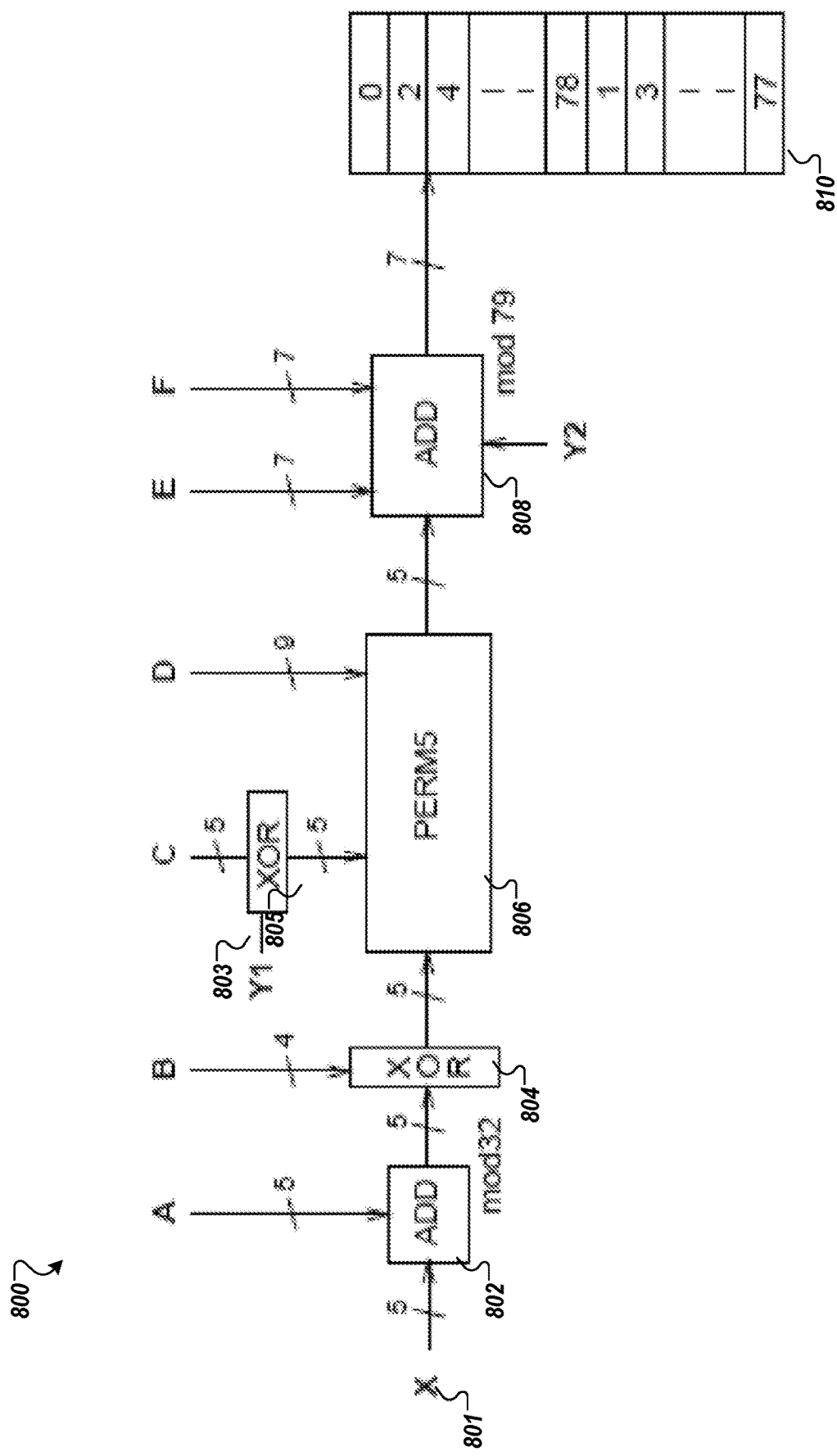
FIG. 8 is a selection procedure for deriving a first set of frequencies from an address of a second device and a clock of the second device according to one embodiment.

In another embodiment, the processing logic derives the first set of frequencies from an address of the second device and clock data received from the second device in the first message. The clock data is indicative of a clock at the second device. The Bluetooth® specification describes a basic hop selection kernel that is used for the page, page response, inquiry, inquiry response, and basic channel hopping selection kernels. As illustrated in FIG. 8, the selection procedure can include an addition operation, an XOR operation, a permutation operation, an addition operation, and finally a register selection. Additional details of the selection procedures is described below with respect to FIG. 8

In another embodiment, the processing logic sends selecting a frequency from the first set of frequencies at a first rate, the first rate being higher than a second rate at which the second device selects a frequency from the first set of frequencies. For example, a device that is in page scan continuously listens for page messages at different hop frequencies derived out of its own BD_ADDR and CLK. When there are 32 paging frequencies in a page hopping sequence, the paged unit can determine the 32 paging frequencies from the BD_ADDR and scan select a different listening frequency every 1.28 seconds.

In another embodiment, the first message includes comprises clock information of the second device and the processing logic estimates, from the clock information, a hopping frequency that the second device is using for the page hopping sequence.

Figure 6:
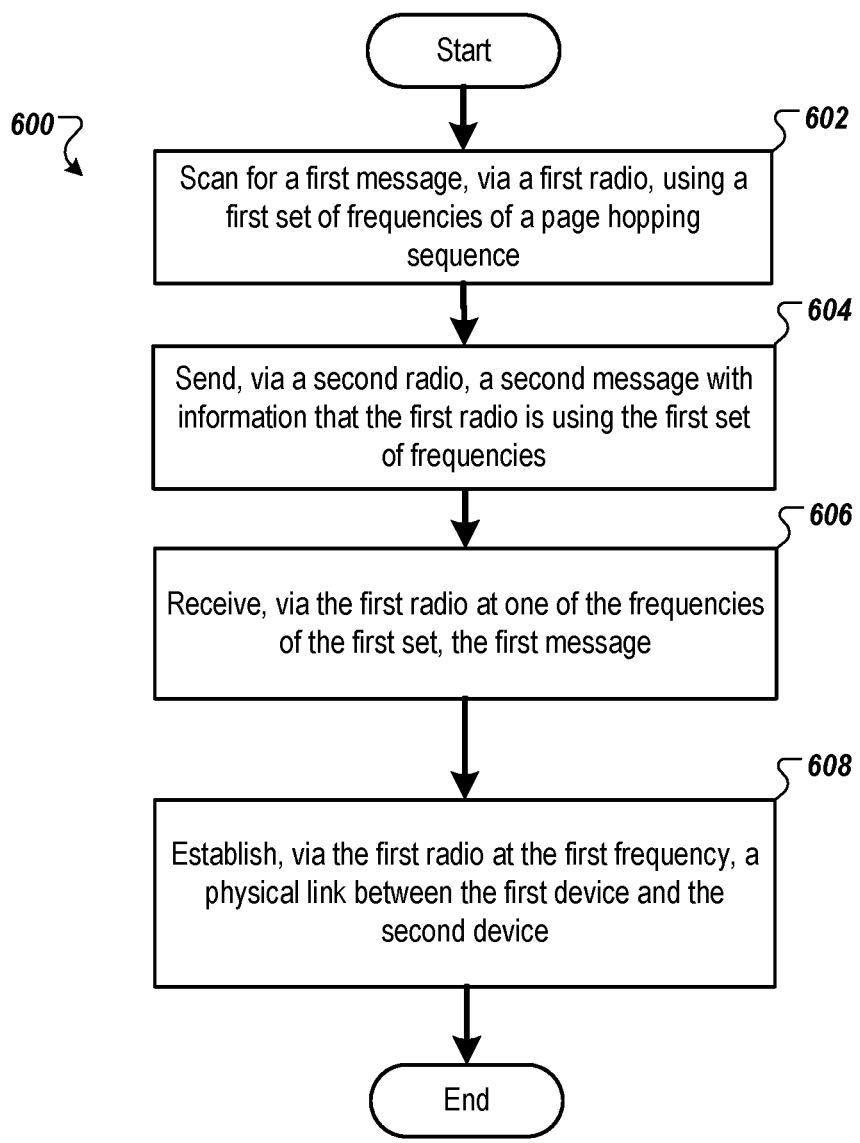
FIG. 6 is a flow diagram of a method for side-channel assistance in establishing a wireless connection between a first device and a second device according to one embodiment.

FIG. 6 is a flow diagram of a method 600 for side-channel assistance in establishing a wireless connection between a first device and a second device according to one embodiment. The method 600 may be performed by processing logic that comprises hardware (e.g., circuitry, dedicated logic, programmable logic, microcode, etc.), software, firmware, or a combination thereof. In one embodiment, the method 600 may be performed by any of the secondary devices 102 described herein and illustrated with respect to FIGS. 1-4. The method 600 can be used by the secondary device for out-of-band transport assistance to establish a wireless connection between the secondary device and a primary device.

Referring back to FIG. 6, the method 600 begins by the processing logic scanning for a first message, via a first radio, using a first set of frequencies of a page hopping sequence (block 602). The page hopping sequence includes the first set of frequencies and a second set of frequencies. The first message includes an identifier corresponding to the first device (e.g., the secondary device). The processing logic sends, via a second radio, a second message comprising information that the first radio is using only the first set of frequencies to establish a wireless connection with a second device via the first radio (block 604). The processing logic receives, via the first radio at a first frequency of the first set of frequencies, the first message with the identifier corresponding to the first device responsive to the second device receiving the second message and repeatedly sending the second message according to only the first set of frequencies of the page hopping sequence (block 606). The processing logic establishes, via the first radio at the first frequency, a physical link between the first device and the second device (block 608); and the method 600 ends.

In one embodiment, the first radio is a first wireless WPAN radio that operates according to a first WPAN protocol and the second radio is a second WPAN radio that operates according to a second WPAN protocol that is different than the first WPAN protocol. The first WPAN radio consumes less power than the second WPAN radio. In another embodiment, the first radio is a NFC radio that operates according to a NFC protocol and the second radio is a WPAN radio that operates according to a WPAN protocol.

In another embodiment, the processing logic scans for the first message by: selecting a first frequency from the first set of frequencies using an address of the first device; scanning for the first message at the first frequency during a first scan window; selecting a second frequency from the first set of frequencies using the address of the first device; and scanning for the first message at the second frequency during a second scan window after the first scan window.

In another embodiment, the processing logic scans for the first message by: selecting the first frequency from the first set of frequencies using the address of the first device; scanning for the first message at the first frequency during a subsequent scan window after the second scan window; and in response to receiving the first message at the first frequency, ceasing to scan for the first message during the subsequent scan window.

In another embodiment, the first set of frequencies is a first train (train A) and the second set of frequencies is a second train (train B), each of which identifies a pseudo random set of sixteen different frequencies in the page hopping sequence. The processing logic scans for the first message by scanning for the first message at each of the sixteen different frequencies in the first train for N times until receiving the first message or until an end of a specified time period, where N is a positive integer. In another embodiment, the processing logic scans for the first message by scanning for the first message at each frequency in the first train at a first time and scanning for the first message at each frequency in the first train at one or more times after the first time until receiving the first message or until an end of a specified time period.

In another embodiment, the processing logic derives the first set of frequencies from an address of the first device and a clock at the first device. The second message further includes clock data indicative of the clock at the first device.

In another embodiment, the processing logic selects a different frequency from the first set of frequencies at a first rate that is lower than a second rate at which the second device selects a frequency from the first set of frequencies.

Figure 7:
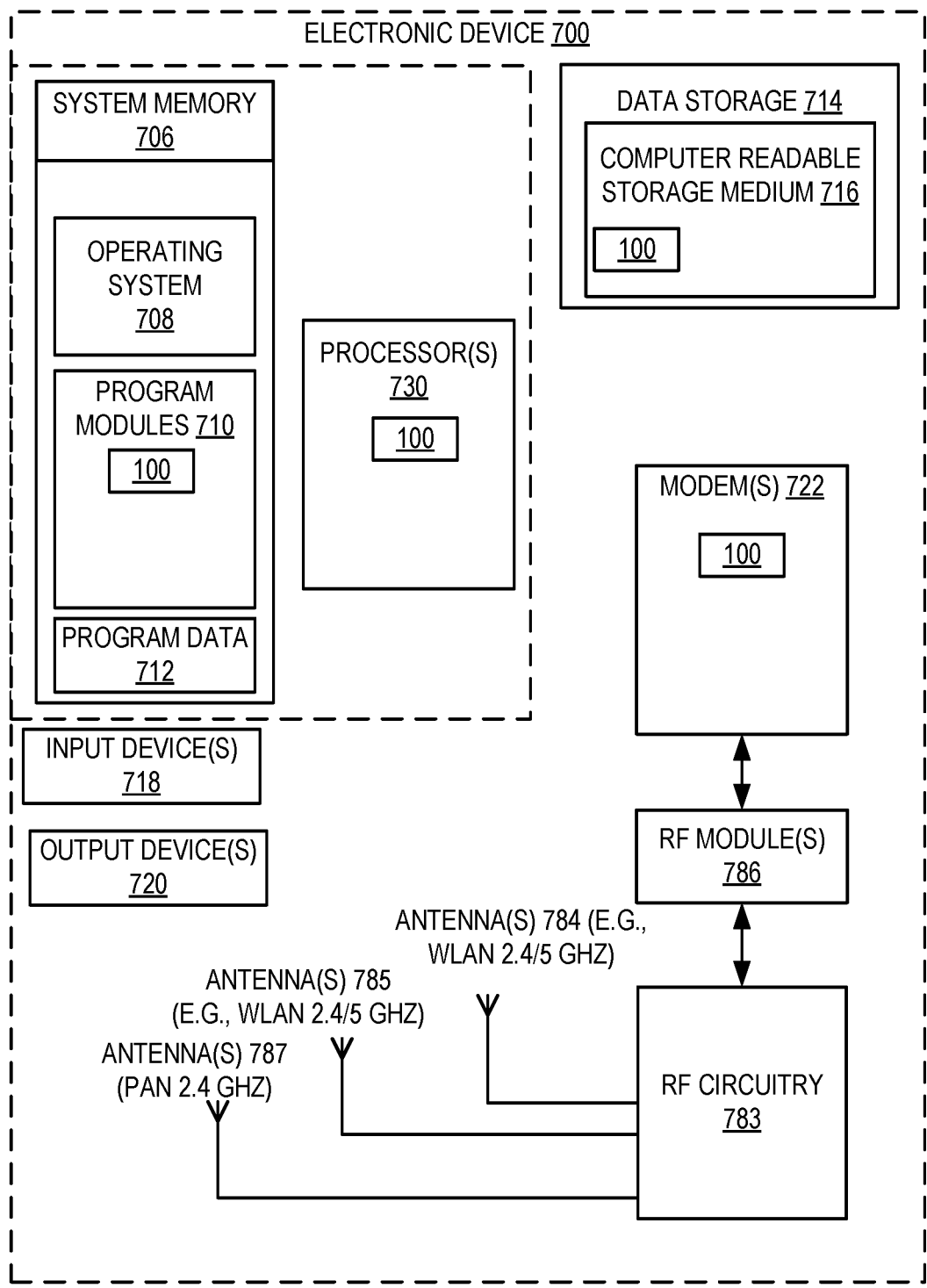
FIG. 7 is a block diagram of an electronic device for providing out-of-band connection assistance in establishing a wireless connection with another electronic device according to one embodiment.

FIG. 7 is a block diagram of an electronic device 700 for providing out-of-band connection assistance in establishing a wireless connection with another electronic device according to one embodiment. The electronic device 700 may correspond to the electronic devices described above with respect to FIGS. 1-7. Alternatively, the electronic device 700 may be other electronic devices, as described herein.

The electronic device 700 includes one or more processor(s) 730, such as one or more CPUs, microcontrollers, field programmable gate arrays, or other types of processors. The electronic device 700 also includes system memory 706, which may correspond to any combination of volatile and/or non-volatile storage mechanisms. The system memory 706 stores information that provides operating system component 708, various program modules 710, program data 712, and/or other components. In one embodiment, the system memory 706 stores instructions of methods to control operation of the electronic device 700. The electronic device 700 performs functions by using the processor(s) 730 to execute instructions provided by the system memory 706. In one embodiment, the program modules 810 may include an out-of-band connection assistance system 711. The out-of-band connection assistance system 711 may perform some or all of the operations of the out-of-band connection assistant processed descried herein, such as method 500 and method 600.

The electronic device 700 also includes a data storage device 714 that may be composed of one or more types of removable storage and/or one or more types of non-removable storage. The data storage device 714 includes a computer-readable storage medium 716 on which is stored one or more sets of instructions embodying any of the methodologies or functions described herein. Instructions for the program modules 710 (e.g., out-of-band connection assistance system 711) may reside, completely or at least partially, within the computer-readable storage medium 716, system memory 706 and/or within the processor(s) 730 during execution thereof by the electronic device 700, the system memory 706 and the processor(s) 730 also constituting computer-readable media. The electronic device 700 may also include one or more input devices 718 (keyboard, mouse device, specialized selection keys, etc.) and one or more output devices 720 (displays, printers, audio output mechanisms, etc.).

The electronic device 700 further includes a modem 722 to allow the electronic device 700 to communicate via a wireless connections (e.g., such as provided by the wireless communication system) with other computing devices, such as remote computers, an item providing system, and so forth. The modem 722 can be connected to one or more Radio Frequency (RF) modules 786. The RF modules 786 may be a WLAN module, a wide area network (WAN) module, WPAN module, Global Positioning System (GPS) module, or the like. The antenna structures (antenna(s) 784, 785, 787) are coupled to the RF circuitry 783, which is coupled to the modem 722. The RF circuitry 783 may include radio front-end circuitry, antenna switching circuitry, impedance matching circuitry, or the like. The antennas 784 may be GPS antennas, NFC antennas, other WAN antennas, WLAN or WPAN antennas, or the like. The modem 722 allows the electronic device 700 to handle both voice and non-voice communications (such as communications for text messages, multimedia messages, media downloads, web browsing, etc.) with a wireless communication system. The modem 722 may provide network connectivity using any type of mobile network technology including, for example, Cellular Digital Packet Data (CDPD), General Packet Radio Service (GPRS), EDGE, universal mobile telecommunications system (UMTS), Single-Carrier Radio Transmission Technology (1×RTT), Evaluation Data Optimized (EVDO), High-Speed Down-link Packet Access (HSDPA), Wi-Fi®, Long Term Evolution (LTE) and LTE Advanced (sometimes generally referred to as 4G), etc.

The modem 722 may generate signals and send these signals to antenna(s) 784 of a first type (e.g., WLAN 5 GHz), antenna(s) 785 of a second type (e.g., WLAN 2.4 GHz), and/or antenna(s) 787 of a third type (e.g., WAN), via RF circuitry 783, and RF module(s) 786 as descried herein. Antennas 784, 785, 787 may be configured to transmit in different frequency bands and/or using different wireless communication protocols. The antennas 784, 785, 787 may be directional, omnidirectional, or non-directional antennas. In addition to sending data, antennas 784, 785, 787 may also receive data, which is sent to appropriate RF modules connected to the antennas. One of the antennas 784, 785, 787 may be any combination of the antenna structures described herein.

In one embodiment, the electronic device 700 establishes a first connection using a first wireless communication protocol, and a second connection using a different wireless communication protocol. The first wireless connection and second wireless connection may be active concurrently, for example, if an electronic device is receiving a media item from another electronic device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 722 is shown to control transmission and reception via antenna (784, 785, 787), the electronic device 700 may alternatively include multiple modems, each of which is configured to transmit/receive data via a different antenna and/or wireless transmission protocol.

FIG. 8 is a selection procedure 800 for deriving a first set of frequencies from an address of a second device and a clock of the second device according to one embodiment. The selection procedure 800 includes an addition operation 802, an XOR operation 804, a permutation operation 806, an addition operation 808, and a register selection of contents of a register 810. During paging, inputs A to E use the address values as given in the corresponding columns a Table: Control of Hop System. It should be noted that inputs X, Y1, and Y2 are used, and F and F' inputs are unused. The clock bits 801 (e.g., CLK6-2 as input X) specify the phase within the length 32 sequence. The clock bits 803 (CLK1 as inputs Y1 and Y2) are used to select between TX and RX. The address inputs determine the sequence order within the segments. The final mapping onto the hop frequencies is determined by the register contents of the register 810.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work to others skilled in the art most effectively. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A system comprising:
   a first device comprising a first processor, a first wireless personal area network (WPAN) radio that operates according to a Bluetooth® (BT) protocol, and a second WPAN radio that operates according to a Bluetooth® Low Energy (BLE) protocol; and
   a second device comprising a second processor, a third WPAN radio that operates according to the BT protocol, and a fourth WPAN radio that operates according to the BLE protocol, wherein:
   the first processor, via the first WPAN radio, performs a page scan in which the first processor listens for a first paging message being sent by the second device according to a first set of frequencies of a page hopping sequence, the first paging message comprising a device access code (DAC) corresponding to the first device and the page hopping sequence comprising the first set of frequencies and a second set of frequencies, wherein the first processor performs the page scan only with the first set of frequencies of the page hopping sequence;
   the first processor, via the second WPAN radio, sends an BLE advertisement message, the BLE advertisement message comprising information that the first processor is performing the page scan using the first set of frequencies via the first WPAN radio;

the second processor, via the fourth WPAN radio, performs a BLE scan process in which the second processor listens for the BLE advertisement message;

the second processor, via the fourth WPAN radio, receives the BLE advertisement message;

the second processor, via the third WPAN radio, performs a paging process in which the second processor repeatedly sends the first paging message with the DAC according to only the first set of frequencies of the page hopping sequence;

the second processor, via the third WPAN radio, receives a response message from the first processor at a frequency of the first set of frequencies; and the second processor establishes a wireless connection between the first device and the second device via the first WPAN radio and the third WPAN radio.

2. The system of claim 1, wherein the first set of frequencies is a first train (train A) and the second set of frequencies is a second train (train B), each of which identifies a pseudo random set of sixteen different frequencies in the page hopping sequence.

3. A method comprising:

receiving a first message, by a first device via a first radio, the first message comprising information that a second device is using either only a first set of frequencies or only a second set of frequencies of a frequency hopping sequence;

sending, by the first device via a second radio, a second message according to only the first set of frequencies or the second set of frequencies specified in the first message, wherein the second message comprises an identifier corresponding to the second device, and wherein the first radio consumes less power than the second radio of the first device;

receiving, by the first device via the second radio at a first frequency of the first set of frequencies, a third message from the second device; and establishing, by the first device via the second radio at the first frequency, a physical link between the first device and the second device.

4. The method of claim 3, wherein the first radio is a first wireless personal area network (WPAN) radio that operates according to a first WPAN protocol and the second radio is a second WPAN radio that operates according to a second WPAN protocol that is different than the first WPAN protocol.

5. The method of claim 3, wherein the first radio is a near field communication (NFC) radio that operates according to a NFC protocol and the second radio is a wireless personal area network (WPAN) radio that operates according to a WPAN protocol.

6. The method of claim 3, wherein sending the second message comprises repeatedly sending the second message in response to receiving the first message and until receiving the third message or until an end of a specified time period.

7. The method of claim 3, wherein the first set of frequencies is a first train, wherein sending the second message comprises sending the second message at each frequency of the first train during a first time period.

8. The method of claim 7, further comprising, in response to receiving the third message from the second device, ceasing to send the second message during the first time period.

9. The method of claim 3, wherein the first set of frequencies is a first train, wherein sending the second message comprises:

sending the second message at each frequency of the first set of frequencies at a first time; and sending the second message at each frequency of the first set of frequencies at one or more times after the first time until receiving the third message or until an end of a specified time period.

10. The method of claim 3, further comprising deriving, by the first device, the first set of frequencies from an address of the second device and clock data received from the second device in the first message, wherein the clock data is indicative of a clock at the second device.

11. The method of claim 3, further comprising selecting a frequency from the first set of frequencies at a first rate, wherein the first rate is higher than a second rate at which the second device selects a frequency from the first set of frequencies.

12. The method of claim 3, wherein the first message further comprises clock information of the second device, and wherein the method further comprises estimating, by the first device from the clock information, a hopping frequency that the second device is using for the frequency hopping sequence.

13. A method comprising:

scanning for a first message, by a first device via a first radio, using only a first set of frequencies of a page hopping sequence, the page hopping sequence comprising the first set of frequencies and a second set of frequencies and the first message comprising an identifier corresponding to the first device;

sending, by the first device via a second radio, a second message comprising information that the first radio is using only the first set of frequencies;

receiving, by the first device via the first radio at a first frequency of the first set of frequencies, the first message with the identifier corresponding to the first device; and establishing, by the first device via the first radio at the first frequency, a physical link between the first device and a second device.

14. The method of claim 13, wherein the first radio is a first wireless personal area network (WPAN) radio that operates according to a first WPAN protocol and the second radio is a second WPAN radio that operates according to a second WPAN protocol that is different than the first WPAN protocol, wherein the first WPAN radio consumes less power than the second WPAN radio.

15. The method of claim 13, wherein the first radio is a near field communication (NFC) radio that operates according to a NFC protocol and the second radio is a wireless personal area network (WPAN) radio that operates according to a WPAN protocol.

16. The method of claim 13, wherein scanning for the first message comprises:

selecting a first frequency from the first set of frequencies using an address of the first device;

scanning for the first message at the first frequency during a first scan window;

selecting a second frequency from the first set of frequencies using the address of the first device; and scanning for the first message at the second frequency during a second scan window after the first scan window.

17. The method of claim 16, wherein scanning for the first message further comprises:

selecting the first frequency from the first set of frequencies using the address of the first device;

scanning for the first message at the first frequency during a subsequent scan window after the second scan window; and in response to receiving the first message at the first frequency, ceasing to scan for the first message during the subsequent scan window.

18. The method of claim 13, wherein the first set of frequencies is a first train wherein scanning for the first message comprises:

scanning for the first message at each frequency in the first train at a first time; and scanning for the first message at each frequency of the first train at one or more times after the first time until receiving the first message or until an end of a specified time period.

19. The method of claim 13, further comprising deriving the first set of frequencies from an address of the first device and a clock at the first device, wherein the second message further comprises clock data indicative of the clock at the first device.

20. The method of claim 19, further comprising selecting a frequency from the first set of frequencies at a first rate that is lower than a second rate at which the second device selects a frequency from the first set of frequencies.

* * * * *